(12) United States Patent
Hirabayashi

(10) Patent No.: US 7,996,996 B2
(45) Date of Patent: Aug. 16, 2011

(54) RECIPROCATING POWER TOOL

(75) Inventor: Shinji Hirabayashi, Anjo (JP)

(73) Assignee: Makita Corporation, Anjo-shi (JP)

( * ) Notice: Subject to any disclaimer, the term of this patent is extended or adjusted under 35 U.S.C. 154(b) by 0 days.

(21) Appl. No.: 10/909,043

(22) Filed: Jul. 30, 2004

(65) Prior Publication Data
US 2005/0022395 A1 Feb. 3, 2005

(30) Foreign Application Priority Data

Aug. 1, 2003 (JP) ................................. 2003-205477

(51) Int. Cl.
*B23D 49/00* (2006.01)
*B23D 49/16* (2006.01)
*B23D 51/00* (2006.01)
*B23D 51/16* (2006.01)

(52) U.S. Cl. ................ 30/392; 30/393; 83/615; 83/632; 74/22 R; 74/50; 74/61

(58) Field of Classification Search ............ 30/392–393, 30/394; 74/44, 50, 49, 22 R, 22 A, 61; 83/615, 83/632

See application file for complete search history.

(56) References Cited

U.S. PATENT DOCUMENTS

| | | | |
|---|---|---|---|
| 2,970,484 A | | 2/1961 | Springer |
| 3,309,932 A | | 3/1967 | Davis |
| 3,827,323 A | * | 8/1974 | Jacobs ............................. 83/310 |
| 3,945,120 A | * | 3/1976 | Ritz ................................. 30/393 |
| 4,344,729 A | * | 8/1982 | Orsinger et al. ......... 414/226.02 |
| 4,763,760 A | * | 8/1988 | Haman et al. .................. 184/6.5 |
| 5,079,844 A | * | 1/1992 | Palm ................................. 30/392 |
| 5,099,705 A | * | 3/1992 | Dravnieks ......................... 74/50 |
| 5,134,777 A | * | 8/1992 | Meyer et al. ..................... 30/392 |
| 5,212,887 A | * | 5/1993 | Farmerie ........................... 30/393 |
| 5,735,165 A | | 4/1998 | Schockman et al. |
| 6,352,004 B1 | * | 3/2002 | Greppmair ......................... 74/44 |
| 6,568,089 B1 | * | 5/2003 | Popik et al. ..................... 30/392 |
| 6,601,465 B2 | * | 8/2003 | Greppmair ......................... 74/61 |

(Continued)

FOREIGN PATENT DOCUMENTS

CN 2504022 Y 8/2002

(Continued)

OTHER PUBLICATIONS

Japanese Office Action for Application No. 2003-205477, dated Jul. 30, 2008.

*Primary Examiner* — Laura M. Lee

(74) *Attorney, Agent, or Firm* — Nelson Mullins Riley & Scarborough LLP; Anthony A. Laurentano

(57) ABSTRACT

The present invention provides a technique for achieving weight reduction of the counter weight while reducing vibration in a reciprocating power tool. A tool bit performs a predetermined operation by reciprocating. A slider reciprocates to drive the tool bit. A motion converting mechanism converts a rotating output of the motor into a reciprocating movement of the slider. A counter weight reciprocates in a direction opposite to the reciprocating direction of the slider to reduce vibration caused by the reciprocating movement of the slider. A component part includes component of motion in a direction parallel to the reciprocating movement of the slider to cooperate with the counter weight in reducing vibration caused within the power tool. Thus, the weight of the counter weight can be decreased.

10 Claims, 5 Drawing Sheets

U.S. PATENT DOCUMENTS

| | | |
|---|---|---|
| 6,763,897 B2 | 7/2004 | Hanke et al. |
| 2002/0014129 A1* | 2/2002 | Greppmair .................. 74/61 |
| 2003/0051352 A1* | 3/2003 | Clark, Jr. .................. 30/392 |
| 2004/0117993 A1* | 6/2004 | Armstrong .................. 30/392 |
| 2004/0187324 A1* | 9/2004 | James et al. .................. 30/394 |
| 2004/0255474 A1* | 12/2004 | Wang .................. 30/392 |
| 2004/0255475 A1* | 12/2004 | Hirabayashi et al. ........... 30/392 |
| 2009/0151486 A1* | 6/2009 | Jonsson .................. 74/63 |

FOREIGN PATENT DOCUMENTS

| | | |
|---|---|---|
| DE | 41 08 984 | 5/1921 |
| DE | 39 21 891 | 1/1991 |
| JP | 9-136197 | 5/1997 |
| JP | 2001-009632 | 1/2001 |

* cited by examiner

RECIPROCATING POWER TOOL

BACKGROUND OF THE INVENTION

1. Field of the Invention

The present invention relates to a reciprocating power tool such as a reciprocating saw and more particularly, to a technique of reducing vibration in actual operation of cutting a work-piece.

2. Description of the Related Art

Japanese non-examined laid-open Patent Publication No. 2001-9632 discloses a reciprocating saw as an example of a reciprocating power tool. The known reciprocating saw includes a motion converting mechanism for causing a slider to reciprocate via the rotational movement of the motor. A tool bit is mounted on the end of the slider. Further, the motion converting mechanism has a counter weight. When the slider reciprocates, the counter weight reciprocates in a direction opposite to the reciprocating direction of the slider, or, with a 180° phase shift with respect to the slider. As a result, vibration caused by reciprocating movement of the slider can be reduced as much as possible, so that the vibration of the power tool can be reduced.

By using such a counter weight that reciprocates with a 180° phase shift with respect to the reciprocating movement of the slider, the momentum, mainly including the inertial force, can be reduced between the slider and the counter weight in the axial direction of the slider. Thus, effective vibration reduction can be realized. However, the weight of the power tool itself is increased by the weight of the counter weight because the counter weight is additionally provided as the motion converting mechanism. Therefore, further improvement is desired in this respect.

SUMMARY OF THE INVENTION

Accordingly, it is an object of the present invention to provide a useful technique for achieving weight reduction of the counter weight while reducing vibration in the reciprocating power tool.

According to the invention, representative reciprocating power tool may include a motor, a tool bit, a slider, a motion converting mechanism, a counter weight and a component part of the motion converting mechanism. The tool bit performs a predetermined operation by reciprocating. The slider reciprocates to drive the tool bit. The motion converting mechanism converts a rotating output of the motor into a reciprocating movement of the slider. The counter weight reciprocates in a direction opposite to the reciprocating direction of the slider to reduce vibration caused by the reciprocating movement of the slider. The component part includes component of motion in a direction parallel to the reciprocating movement of the slider. The component part performs vibration reducing function together with the counter weight. Because component part can move parallel to the reciprocating slider to cooperate with the counter weight in reducing vibration caused within the power tool, the weight of the counter weight can be decreased while keeping the sufficient capability of vibration reducing function.

Other objects, features and advantages of the present invention will be readily understood after reading the following detailed description together with the accompanying drawings and the claims.

DETAILED DESCRIPTION OF THE INVENTION

Figure 1:
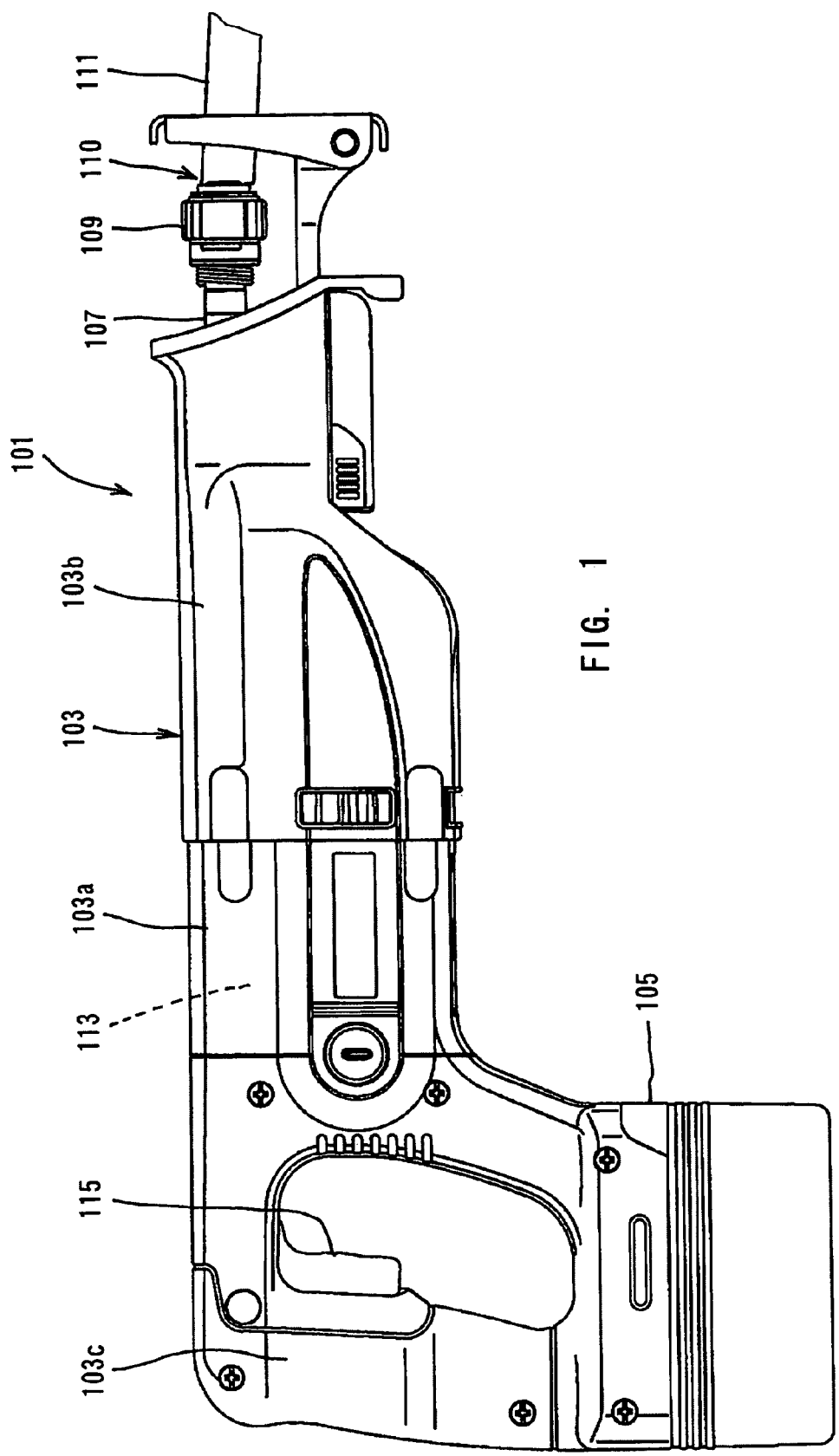
FIG. 1 is a view showing an entire reciprocating saw according to an embodiment of the invention.

According to the present invention, a representative reciprocating power tool may include a motor, a tool bit, a slider, a motion converting mechanism, a counter weight and a component part of the motion converting mechanism. The reciprocating power tool according to the invention may include various power tools such as a reciprocating saw and a jig saw to be used to cut a work-piece of various materials such as wood, metal and stone.

Within the representative power tool, the tool bit performs a predetermined operation by reciprocating. The slider reciprocates to drive the tool bit. The motion converting mechanism converts a rotating output of the motor into a reciprocating movement of the slider.

Further, the counter weight reciprocates in a direction opposite to the reciprocating direction of the slider to reduce vibration caused by the reciprocating movement of the slider. The manner of "reciprocating in a direction opposite to the reciprocating direction of the slider" typically means the manner of reciprocating in opposite phase, or more specifically, with a phase shift of 180° or about 180° with respect to the slider. However, it also embraces the manner in which the phase difference between the reciprocating movement of the slider and the reciprocating movement of the counter weight is set such that a time lag is provided between the instant when the slider reaches a top dead center and the instant when the counter weight reaches a bottom dead center. The counter weight is also referred to as a "balancer".

The component part may include component of motion in a direction parallel to the reciprocating movement of the slider. Preferably, the component part may include an already-existing element, such as a rotating element rotated by a motor, or a motion converting element that rotates together in one piece or in interlock with the rotating element and converts the rotating motion into linear motion, thereby causing the slider to reciprocate. In the representative power tool, the component part performs vibration reducing function together with the counter weight.

According to the present invention, component part can move parallel to the reciprocating slider to cooperate with the counter weight in reducing vibration caused within the power tool. Therefore, the weight of the counter weight can be decreased while keeping the sufficient capability of vibration reducing function, because the already-existing component part of the motion converting mechanism can be partially substituted for the inertial force of the counter weight.

Preferably, the component part may be located in the vicinity of the slider and has components of reciprocating motion in a direction opposite to the reciprocating direction of the slider. Because the component part of the motion converting mechanism is located closer to the reciprocating slider and tool bit, a rotating moment of the slider and tool bit acting upon the power tool around its center of gravity can be efficiently reduced.

Preferably, the component part to cooperate with the counterweight may be defined by a crank and a crank pin that couples the crank to the slider. Further, the gravity center of the crank may be located at a position shifted from the center of rotation of the crank toward the counter weight when the counter weight is in a position remote form the tool bit. With this construction, when the power tool is driven and the crank rotates, centrifugal force is provided to the crank in a direction opposite to the moving direction of the slider. Therefore, the centrifugal force acts in a manner that assists the inertial force of the counter weight. As a result, combined force of the inertial force of the counter weight and the centrifugal force of the crank can act in a direction opposite to the inertial force of the slider and the tool bit. Thus, the capability of efficiently reducing vibration can be ensured.

Each of the additional features and method steps disclosed above and below may be utilized separately or in conjunction with other features and method steps to provide improved reciprocating power tools and method for using such reciprocating power tools and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

A representative embodiment of the present invention will now be described with reference to the drawings. As shown in FIG. 1, a reciprocating saw 101 as a representative embodiment of the power tool according to the present invention includes a body 103, a battery pack 105 that is removably attached to the body 103, a slider 107 that projects from the body 103 and a blade 111 that is mounted to a chuck 109 on the end of the slider 107 and cuts a work-piece (not shown). The blade 111 is a feature that corresponds to the "tool bit" according to the present invention. A motor housing 103a, a gear housing 103b and a handgrip 103c form the body 103 in one piece.

The motor housing 103a of the body 103 houses a motor 113. The motor 113 is driven when the user depresses a trigger switch 115. The blade 111 then reciprocates together with the slider 107 and the chuck 109 and can cut a workpiece. The slider 107, the chuck 109 and the blade 111 form a movable part 110.

Figure 2:
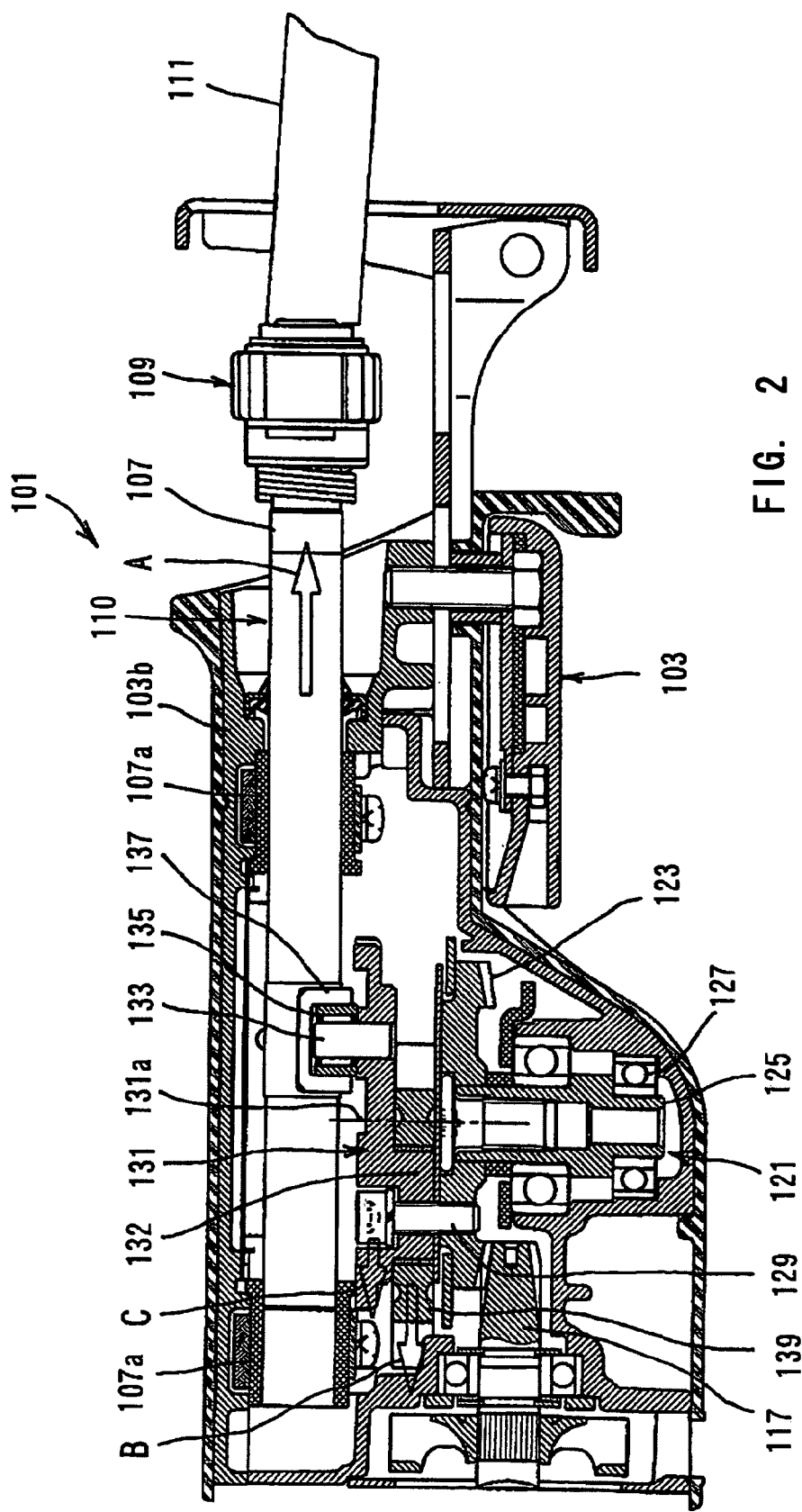
FIG. 2 is a partial, sectional view of an essential part of the representative reciprocating saw.

FIG. 2 shows an essential part of the reciprocating saw 101 according to the present invention. In FIG. 2, the motor housing 103a and the handgrip 103c are not shown. As shown in FIG. 2, bearings 107a support the slider 107 such that the slider 107 can reciprocate in its axial direction. The slider 107 is connected to a motor output shaft 117 via a motion converting mechanism 121 that is disposed within the gear housing 103b of the body 103.

The motion converting mechanism 121 is adapted to convert the rotational motion of the motor output shaft 117 into the reciprocating motion in the axial direction of the slider 107. The motion converting mechanism 121 comprises a bevel gear 123, an eccentric pin 129, a crank disc 131, a crank pin 133 and a counter weight 139. The crank disc 131 is a feature that corresponds to the "crank" according to the present invention. The crank disc 131 serves as a motion converting element which causes the slider 107 and the counter weight 139 to reciprocate via the rotating output of the motor 113. A phase difference of 180° is provided between the reciprocating motion of the slider 107 and the reciprocating motion of the counter weight 139, and the counter weight 139 reciprocates with a phase delay, which will be described below.

The bevel gear 123 is a rotating element which is rotated by the motor 113. The bevel gear 123 is rotatably supported by bearings 127 and mounted on the upper end of a rotating shaft 125 such that the bevel gear 123 can rotate together with the rotating shaft 125. The bevel gear 123 engages with the motor output shaft 117. One end of the eccentric pin 129 is threadingly inserted into the bevel gear 123 at a position shifted a predetermined distance from the center of rotation of the bevel gear 123. The eccentric pin 129 has a large-diameter head and a washer on the other end. The crank disc 131 is disposed between the large-diameter head and washer and the bevel gear 123 and thus integrated with the bevel gear 123 via the eccentric pin 129.

When the bevel gear 123 rotates around the rotating shaft 125, the eccentric pin 129 revolves around the rotating shaft 125, and thus the crank disc 131 rotates together with the revolving eccentric pin 129 in one piece. Specifically, the crank disc 131 rotates together with the bevel gear 123 in one piece, and its center of rotation coincides with the center of the rotating shaft 125. The center of rotation of the crank disc 131 is designated by 131a.

The crank pin 133 is fitted to the crank disc 131 at a position shifted a predetermined distance from the center of rotation 131a. The lower end of the crank pin 133 is press-fitted into a pin mounting hole 131b (see FIGS. 5 and 6) that is formed through the crank disc 131. The upper end of the crank pin 133 is fitted in a slider block 137 of the slider 107 via a bearing 135. Thus, the crank pin 133 can rotate with respect to the slider 107.

Figure 3:
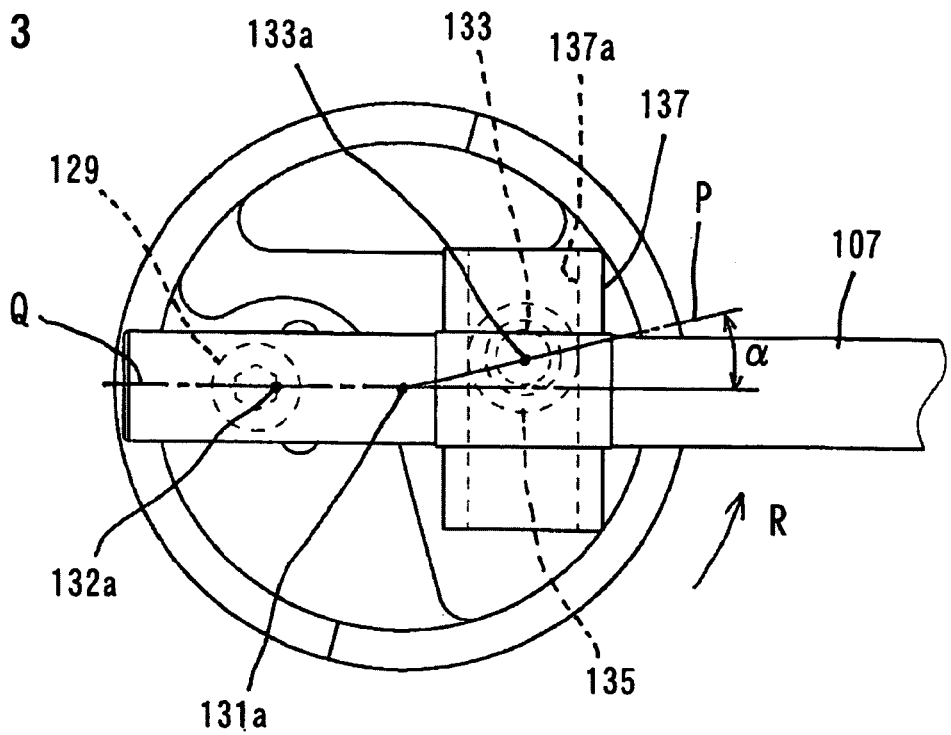
FIG. 3 is a plan view showing a motion converting mechanism and a slider.

As shown in FIGS. 2 and 3, the slider block 137 has a guide groove 137a extending in a direction crossing the longitudinal axis of the slider 107. The crank pin 133 can move with respect to the slider block 137 along the guide groove 137a via the bearing 135 that is fitted in the guide groove 137a. Of the revolving motion of the crank pin 133 around the rotating shaft 125 (see FIG. 2), components of the motion in the direction crossing the longitudinal axis of the slider 107 within a horizontal plane escape into the guide groove 137a and only components of the motion in the axial direction of the slider 107 are transmitted to the slider 107. The slider 107 is thus allowed to reciprocate only in its axial direction.

Figure 4:
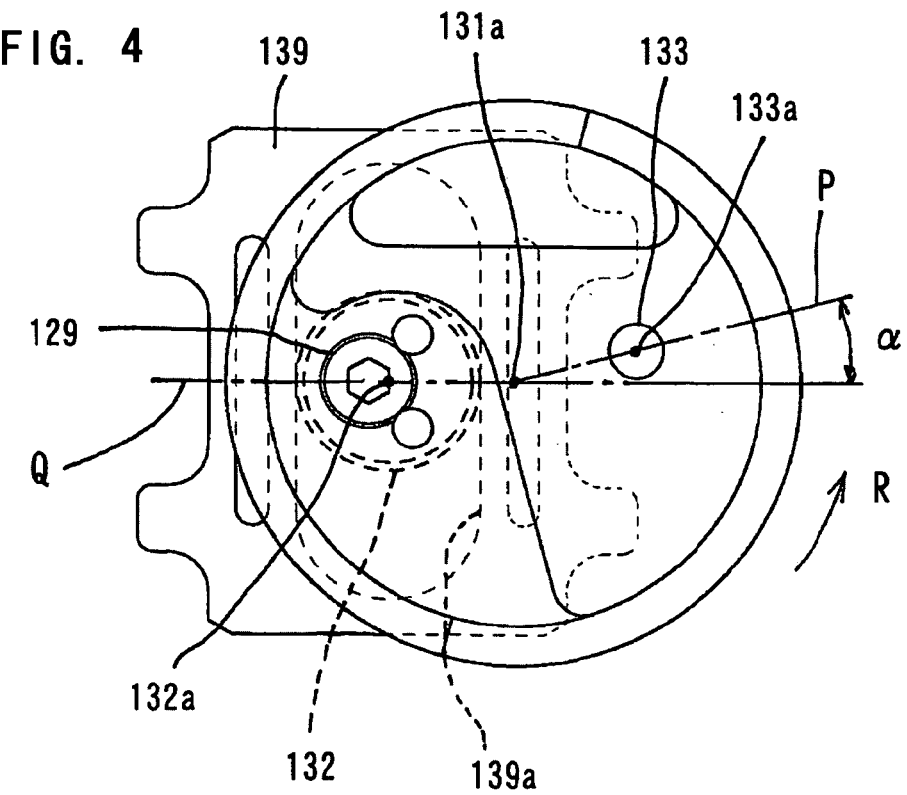
FIG. 4 is a plan view showing a motion converting mechanism and a counter weight.

As shown in FIGS. 2 and 4, the crank disc 131 has a counter weight driving part 132 at a position shifted a predetermined distance from the center of rotation 131a. The counter weight driving part 132 and the crank pin 133 are placed on opposite sides of the center of rotation 131a. The counter weight driving part 132 includes a cam element formed around an eccentric pin mounting hole 131c (see FIGS. 5 and 6) through which the eccentric pin 129 is inserted. The counter weight driving part 132 has a circular contour.

The counter weight 139 is loosely fitted around the counter weight driving part 132. As shown in FIG. 4, the counter weight 139 has an engagement slot 139a extending in a direction crossing the longitudinal axis of the slider 107. The counter weight driving part 132 is fitted in the engagement slot 139a and can move with respect to the counter weight 139. Of the revolving motion of the counter weight driving part 132 around the center of rotation 131a, when the crank disc 131 is rotated, components of the motion in the direction crossing the longitudinal axis of the slider 107 within a horizontal plane escape into the engagement slot 139a and only components of the motion in the axial direction of the slider 107 are transmitted to the counter weight 139. Thus, the counter weight 139 is allowed to reciprocate only in the axial direction of the slider 107.

Although it is not particularly shown, the counter weight 139 is slidably supported by a slide guide of a retaining plate that is mounted onto the body 103, so that a reliable reciprocating movement of the counter weight 139 is ensured.

As shown in FIGS. 3 and 4, a line "P" connecting the center of rotation 131a and a center 133a of the crank pin 133 is inclined an angle "α" in the direction of rotation of the crank disc 131 with respect to a line "Q" connecting the center of rotation 131a and a center 132a of the counter weight driving part 132. Therefore, when the crank disc 131 is rotated in the direction of arrow "R" (counterclockwise) around the center of rotation 131a together with the rotating shaft 125 (see FIG. 2), the phase of rotation of the counter weight driving part 132 is delayed by an angle corresponding to the angle "α" with respect to the phase of rotation of the crank pin 133.

Figure 5:
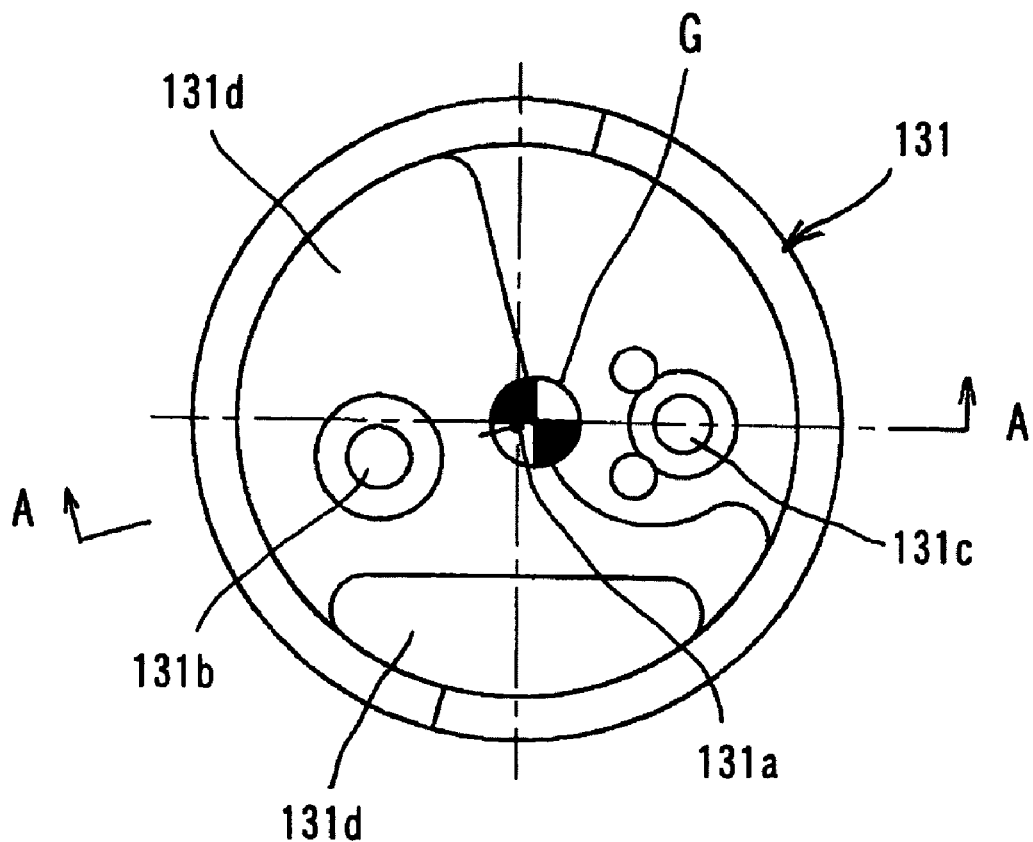
FIG. 5 is a plan view showing a crank disc.
Figure 6:
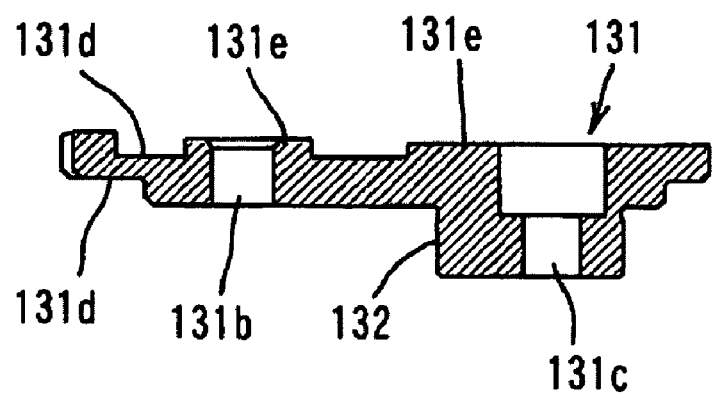
FIG. 6 is a sectional view taken along line A-A in FIG. 5.

FIGS. 5 to 8 show the crank disc 131. In this embodiment, as shown in FIG. 5, the center of gravity "G" of the crank disc 131 is located at a position shifted a predetermined distance from the center of rotation 131a toward the counter weight driving part 132. Specifically, the gravity center "G" of the crank disc 131 is displaced from the center of rotation 131a toward the counter weight 139 when the counter weight 139 is in a position remote from the blade 111. FIG. 5 is a plan view of the crank disc 131, and FIG. 6 is a sectional view taken along line A-A in FIG. 5. The crank disc 131 has a circular contour. The eccentric pin mounting hole 131c for receiving the eccentric pin 129 and the counter weight driving part 132 is formed on the side diametrically opposite to the crank pin mounting hole 131b for receiving the crank pin 131, with respect to the center of rotation 131a.

Figure 7:
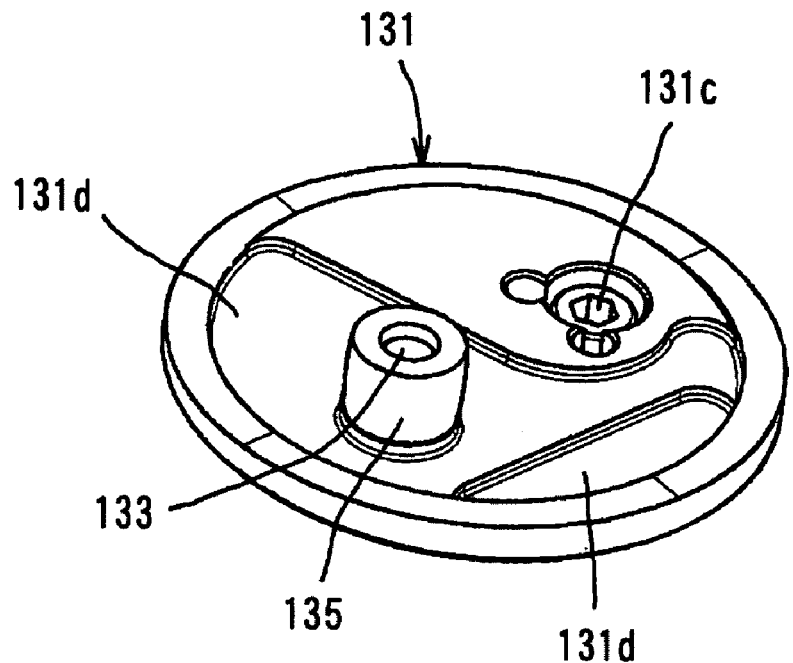
FIG. 7 is a perspective view showing the top side of the crank disc.
Figure 8:
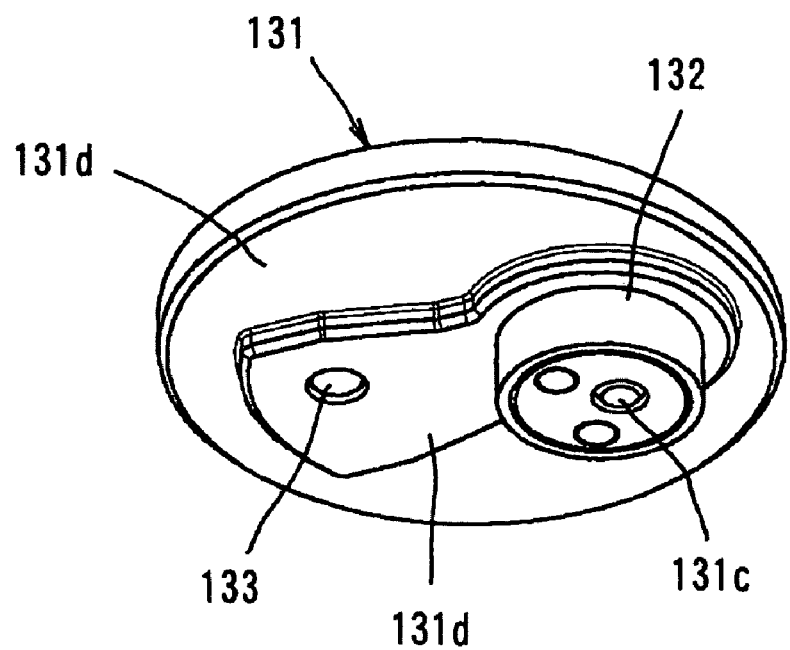
FIG. 8 is a perspective view showing the bottom side of the crank disc.

The position of the gravity center "G" of the crank disc 131 is determined with respect to the state in which the crank pin 133 is fitted in the crank pin mounting hole 131b and the bearing 135 is fitted around the crank pin 133 as shown in FIGS. 7 and 8. Otherwise, determined with respect to the state in which the weights of the crank pin 133 and the bearing 135 are added to the weight of the crank disc 131. The position of the gravity center "G" is adjusted in consideration of the strength of hole surrounding portions around the mounting holes 131b, 131c to which load is applied. Such adjustment can be made by varying the thickness of the crank disc 131 stepwise in the circumferential or radial direction of the crank disc 131 and forming the hole surrounding portions having an increased wall thickness. Specifically, the crank disc 131 has a circular contour, and a stepped portion 131d is formed in the circumferential or radial direction on the upper or lower surface of the crank disc 131. Further, a thick wall portion 131e is formed around the crank pin mounting hole 131b and the eccentric pin mounting hole 131c and has a larger thickness in the thickness direction of the crank disc than the other part of the crank disc.

The crank disc 131 is shaped as a rotating member. Therefore, advantageously with the construction as mentioned above, in which the crank disc 131 has a circular contour and the position of the gravity is determined by adjustment in configuration, the balance of the crank disc in its rotating movement can be readily achieved compared with, for example, a crank formed into a known rectangular shape.

In this embodiment, as mentioned above, of all the component parts forming the motion converting mechanism 121, the crank disc 131 is located nearest to the slider 107, and the gravity center "G" of the crank disc 131 is located at a position shifted (displaced) from the center of rotation 131a toward the counter weight driving part 132. As a result, greater centrifugal force is caused at the position of the gravity center "G" than the other part of the crank disc 131 during rotation of the crank disc 131. The crank disc 131 is a feature that corresponds to "component part" of the present invention.

Operation and usage of the reciprocating saw 101 constructed as described above will now be explained. When the user depresses the trigger switch 115 of the handgrip 103c, the motor 113 is driven by driving current supplied from the battery 105. Thus, the motor output shaft 117 (shown in FIG. 2) is rotated. When the motor output shaft 117 rotates, the bevel gear 123 that engages with the motor output shaft 117 rotates around the rotating shaft 125 in a horizontal plane. Then, the eccentric pin 129 that is eccentrically disposed in a position displaced from the rotating shaft 125 revolves around the rotating shaft 125. As a result, the crank disc 131 rotates around the center of rotation 131a in a horizontal plane together with the eccentric pin 129.

As the crank disc 131 rotates, the crank pin 133 revolves around the center of rotation 131a. The crank pin 133 is loosely fitted in the slider block 137 via the bearing 135. By the revolving movement of the crank pin 133, the slider 107 reciprocates between the top dead center and the bottom dead center. Thus, the blade 111 (see FIG. 2) coupled to the chuck 109 on the end of the slider 107 reciprocates in the axial direction of the slider 107 and is allowed to cut the workpiece.

While the slider 107 reciprocates, the counter weight 139 reciprocates between the top dead center and the bottom dead center via the counter weight driving part 132 of the crank disc 131, in order to reduce vibration of the reciprocating saw 101 by reducing the kinetic energy (momentum) caused by the reciprocating movement of the slider 107. When the movable part 110 including the slider 107, the chuck 109 and the blade 111 moves, for example, rightward as viewed in FIG. 2, rightward inertial force shown by arrow "A" in FIG. 2 is provided to the movable part 110. At this time, the counter weight 139 moves leftward as viewed in FIG. 2 and thus, leftward inertial force shown by arrow "B" in FIG. 2 is provided to the counter weight 139.

If the inertial forces "A" and "B" acting in opposite directions have the same magnitude, the forces will be balanced. As a result, kinetic energy (momentum) caused in the reciprocating direction by the reciprocating movement of the movable part 110 will be reduced by the reciprocating movement of the counter weight 139. Thus, vibration reduction of the reciprocating saw 101 will be efficiently achieved. However, according to this embodiment, centrifugal force "C" is provided to the crank disc 131 in a manner that assists the inertial force B provided to the counter weight 139. Specifically, with the construction in which the gravity center "G" of the crank disc 131 is located at a position shifted from the center of rotation 131a in the moving direction of the counter weight 139, when the counter weight 139 moves leftward as viewed in FIG. 2, leftward centrifugal force shown by arrow "C" in FIG. 2, or components of motion in the moving direction of the counter weight 139 can be provided to the crank disc 131. Thus, the "combined force" of the inertial force "B" of the counter weight 139 and the centrifugal force "C" of the crank disc 131 acts in a direction opposite to the inertial force "A" of the movable part 110. As a result, vibration caused in the reciprocating direction by the reciprocating movement of the movable part 110 can be reduced.

Thus, in this embodiment, the crank disc 131, which is an already-existing component part forming the motion converting mechanism 121, performs part of the vibration reducing function of the counter weight 139, or in other words, functions as a "balancer". The centrifugal force "C" of the crank disc 131 assists the inertial force "B" of the counter weight 139 in reducing the inertial force "A" of the movable part 110. Therefore, the weight of the counter weight 139 which is a determinant of the inertial force "B" of the counter weight 139 can be reduced by the weight corresponding to the centrifugal force "C" of the crank disc 131. As a result, the weight reduction of the reciprocating saw 101 can be achieved.

Further, when the slider 107 reciprocates, a rotating moment acts vertically (as viewed in FIG. 2) upon the reciprocating saw 101 around the center of gravity of the reciprocating saw 101. The rotating moment has a magnitude responsive to the inertial force "A" of the movable part 110. When the movable part 110 moves rightward as viewed in FIG. 2, the rotating moment acts in a manner that may cause the tip end of the reciprocating saw 101 to point downward. While, when the movable part 110 moves leftward, the rotating moment acts in a manner that may cause the tip end to point upward. In this embodiment, another rotating moment can be caused in a direction opposite to the above-mentioned rotating moment by the centrifugal force "C" of the crank disc 131, which is a component part nearest to the slider 107. Thus, the rotating moment caused by the centrifugal force "C" can reduce the rotating moment caused by the movable part 110 in cooperation with the rotating moment caused by the inertial force "B" of the counter weight 139. Consequently, the capability of reducing vertical vibration caused in the reciprocating saw 101 can be improved.

The centrifugal force "C" of the crank disc 131 acts in the lateral direction of the reciprocating saw 101, as well. Therefore, the vibration value in the lateral direction tends to be larger. However, in the reciprocating saw 101 of this embodiment, the above-mentioned reduction of the rotating moment in the vertical direction has a greater influence than the growing imbalance of the lateral force. Accordingly, the three-axis combined vibration value, i.e. the resultant vibration value of the longitudinal, vertical and lateral vibrations, can be reduced.

In the state of cutting a workpiece with the reciprocating saw 101, that is, under loaded driving conditions for cutting a work-piece, it is necessary to consider not only the effect of the inertial force "A" of the movable part 110 that is caused by the slider 107, the chuck 109 and the blade 111 reciprocating together in one piece, but also the effect of the cutting resistance that is caused by friction between the work-piece and the blade 111. This is because the timing for vibration reduction by the counter weight 139 may be shifted due to such cutting resistance received from the work-piece.

Specifically, the inertial force "A" acts in the advancing direction of the movable part 110, while the cutting resistance acts in the direction opposite to this advancing direction. Further, the inertial force "A" is determined by the acceleration of the movable part 110, while the cutting resistance is determined by the speed of the movable part 110. There is a phase difference of 90° between the inertial force "A" and the cutting resistance. Thus, the force (cutting resistance) having a different phase is applied, as a function in which the speed is a variable, to the inertial force "A" caused by the movable part 110. Therefore, in order to effectively reduce vibration in the reciprocating saw 101 under loaded driving conditions, not only the inertial force "A" but the cutting resistance to be received from the workpiece must be taken into account.

The cutting resistance is determined by the speed of the above-mentioned elements. However, in actual operation, the speed of these elements varies within a certain range according to parameters such as a force of pressing the blade 111 upon the work-piece. In order to realize vibration reduction of the reciprocating saw 101 which can fully accommodate such fluctuations of the cutting resistance, the structure of the reciprocating saw 101 may become complicated and, particularly as for mass-market models, such may not be practical.

Therefore, in this embodiment, it is intended to take a measure to reduce vibration as much as possible without complicating the structure of the reciprocating saw 101. To this end, first, a value of cutting resistance which frequently appears is chosen in advance. Then, according to the cutting resistance, the positional relationship between the counter weight driving part 132 and the crank pin 133 including the slider driving part on the crank disc 131 is fixedly set such that a phase delay is caused in the counter weight driving part 132 side with respect to the crank pin 133 side by the predetermined angle "α" as shown in FIGS. 3 and 4. Thus, it is configured such that the phase difference between the reciprocating movement of the slider 107 and the reciprocating movement of the counter weight 139 is in the steady state. The predetermined angle "α" is determined according to the above-mentioned chosen cutting resistance and it is about 15° in this embodiment.

As a result, compared with the technique in which the crank pin 133 and the counter weight driving part 132 are disposed in series (aligned on the line Q shown in FIGS. 3 and 4), the phase of the reciprocating movement of the counter weight 139 is delayed by the amount corresponding to the angle "α" from the 180° phase shifted state with respect to the phase of the reciprocating movement of the slider 107. In other words, the counter weight driving part 132 is fixed in the relatively delayed state with respect to the crank pin 133 and rotated, so that the counter weight 139 reaches the bottom dead center with a time delay after the slider 107 reaches the top dead center.

According to this embodiment, the positional relationship between the crank pin 133 and the counter weight driving part 132 is fixedly set, taking into account a certain cutting resistance that the blade 111 receives from the work-piece. As a result, the phase difference between the reciprocating movement of the slider 107 and the reciprocating movement of the counter weight 139 is fixedly set such that a time lag is provided between the instant when one of the members reaches a top dead center and the instant when the other reaches a bottom dead center. Thus, taking into account the cutting resistance which most frequently appears in actual cutting operation, the phase difference can be fixedly set to an angle at which the effect of vibration reduction can be maximized in practical use. Vibration reduction can be realized as effectively as possible without complicating the structure of the reciprocating saw 101.

In this embodiment, the crank disc 131, which is located nearest to the slider 107 of all the component parts forming the motion converting mechanism 121, is adapted to perform part of the vibration reducing function together with the counter weight 139. However, if the influence of the value of the lateral vibration caused by the centrifugal force C of the crank disc 131 is too small to be significant in cutting operation, it may be constructed such that, instead of the crank disc 131, the bevel gear 123 performs the additional function as a balancer. If necessary, both the crank disc 131 and the bevel gear 123 may have an additional function as a balancer. Further, in this embodiment, the crank disc 131 has a circular shape, but it is not limited to the circular shape.

Further, although, in this embodiment, the reciprocating saw 101 is described as a representative example of a reciprocating power tool, this invention may be widely applied to any tool such as a jig saw, which performs an operation on a workpiece while reciprocating.

DESCRIPTION OF NUMERALS

101 reciprocating saw (reciprocating power tool)
103 body
105 battery
107 slider (movable part)
107a bearing
109 chuck (movable part)
110 movable part
111 blade (tool bit, movable part)
113 motor
115 trigger switch
117 motor output shaft
121 motion converting mechanism
123 bevel gear
125 rotating shaft
127 bearing
129 eccentric pin
131 crank disc (crank, one component part)
131a center of rotation
131b crank pin mounting hole
131c eccentric pin mounting hole
132 counter weight driving part
132a center
133 crank pin
133a center
135 bearing
137 slider block
137a guide groove
139 counter weight
139a engagement hole

What is claimed is:

1. A reciprocating power tool, comprising:
   a motor,
   a tool bit that performs a predetermined operation by reciprocating,
   a slider that reciprocates to drive the tool bit,
   a motion converting mechanism that converts a rotating output of the motor into a reciprocating movement of the slider, the motion converting mechanism comprising a rotating crank disc comprising a slider driving part and further comprising a counterweight driving part and a crank pin disposed on opposite sides of the center of rotation of the crank disc, wherein the crank disc has a circular contour, a stepped portion and a thick wall portion, wherein the stepped portion is formed in the circumferential or radial direction of the crank disc and the thick wall portion is formed around a hole that penetratingly extends through the crank disc, the thick wall portion having a larger thickness in the thickness direction of the disc than the other parts of the crank disc
   a counter weight separate and distinct from the crank disc that reciprocates in a linear direction opposite to the reciprocating direction of the slider to reduce vibration caused by the reciprocating movement of the slider in a first vibration reducing function,
   a vibration alleviating mechanism defined by a portion of the crank disc having a component of motion in a direction parallel to the reciprocating movement of the slider to perform a second vibration reducing function together with the first vibration reducing function to reduce vibration,
   wherein a line connecting the center of rotation of the crank disc and a center of the crank pin is inclined by an angle in the direction of rotation of the crank disc with respect to a line connecting the center of rotation of the crank disc and a center of the counterweight driving part, and
   wherein the crank disc is coupled to the slider by means of the crank pin and the center of gravity of the crank disc fitted with the crank pin without the counterweight is located at a position offset from the center of rotation of the crank disc toward the counter weight when the counter weight is in a position remote from the tool bit to provide the second vibration reducing function.

2. The reciprocating power tool as defined in claim 1, wherein a phase difference between the reciprocating movement of the slider and the reciprocating movement of the counterweight is fixedly set such that a time lag is provided between the instant when one of the slider or the counterweight reaches its top dead center and the instant when the other reaches its bottom dead center, the phase difference being fixedly set at the angle at which the effect of vibration reduction is maximized.

3. The reciprocating power tool as defined in claim 2, wherein the angle is 15°.

4. The reciprocating power tool as defined in claim 1, wherein the crank disc creates a centrifugal force during rotation that results in a first rotating moment and the counterweight creates an inertial force that causes a second rotating moment, and the first rotating moment and the second rotating moment cooperate to reduce a rotating moment of the slider.

5. The reciprocating power tool as defined in claim 1, wherein the center of the counterweight driving part and the center of the crank pin are disposed on opposite sides of the center of rotation of the crank disc when the counter weight is in a position remote from the tool bit.

6. A reciprocating power tool, comprising:
   a motor,
   a tool bit that performs a predetermined operation by reciprocating,
   a slider that reciprocates to drive the tool bit,
   a motion converting mechanism that converts a rotating output of the motor into a reciprocating movement of the slider, the motion converting mechanism comprising a rotating crank disc comprising a slider driving part, a counterweight driving part and a crank pin disposed on opposite sides of the center of rotation of the crank disc,
   a counter weight separate and distinct from the crank disc that reciprocates in a linear direction opposite to the reciprocating direction of the slider to reduce vibration caused by the reciprocating movement of the slider in a first vibration reducing function,
   a bevel gear that drives the crank disc by utilizing rotational torque of the motor,
   wherein a line connecting the center of rotation of the crank disc and a center of the crank pin is inclined by an angle in the direction of rotation of the crank disc with respect to a line connecting the center of rotation of the crank disc and a center of the counterweight driving part,
   wherein a portion of the crank disc has a first component of motion in a first direction parallel to the reciprocating movement of the slider, the crank disc being coupled to the slider by means of the crank pin, and the center of gravity of the crank disc fitted with the crank pin without the counterweight being located at a position offset from the center of rotation of the crank disc toward the counter weight when the counter weight is in the position remote from the tool bit to provide a second vibration reducing function that cooperates with the first vibration reducing function to reduce vibration, and wherein a portion of the bevel gear has a second component of motion in a second direction parallel to the reciprocating movement of the slider for performing a vibration reducing function together with the counter weight, and the center of gravity of the bevel gear is located at a position offset from the center of rotation of the bevel gear toward the counter weight when the counter weight is in a position-remote from the tool bit.

7. The reciprocating power tool as defined in claim 1, wherein the crank disc is located in the vicinity of the slider and has components of reciprocating motion in a direction opposite to the reciprocating direction of the slider.

8. The reciprocating power tool as defined in claim 1, wherein the crank disc has a circular contour, a stepped portion and a thick wall portion, wherein the stepped portion is formed in the circumferential or radial direction of the crank disc and the thick wall portion is formed around a hole that penetratingly extends through the crank disc, the thick wall portion having a larger thickness in the thickness direction of the disc than the other part of the crank disc.

9. The reciprocating power tool as defined in claim 1, wherein the tool bit is defined by a saw blade that performs cutting operation to a work-piece by reciprocating.

10. The reciprocating power tool as defined in claim 1, wherein the counter weight includes a slot extending in a direction crossing the longitudinal axis of the slider, the slot transmits only the component of the motion in the axial direction of the slider to the counter weight.

* * * * *